(12) United States Patent
Sahoo

(10) Patent No.: US 7,016,922 B1
(45) Date of Patent: Mar. 21, 2006

(54) INTELLIGENT OBJECT VERSIONING

(75) Inventor: Keshaba Chandra Sahoo, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/560,434

(22) Filed: Apr. 27, 2000

(51) Int. Cl.
 G06F 7/00 (2006.01)
 G06F 17/30 (2006.01)
 G06F 15/00 (2006.01)

(52) U.S. Cl. .................. 707/203; 707/1; 707/103 R
(58) Field of Classification Search ............... 767/200; 707/205, 100–103 R, 200–203, 1; 715/511
See application file for complete search history.

(56) References Cited

U.S. PATENT DOCUMENTS

| | | | | |
|---|---|---|---|---|
| 5,638,504 | A | | 6/1997 | Scott et al. .................. 715/530 |
| 5,671,428 | A | * | 9/1997 | Muranaga et al. .......... 715/751 |
| 5,732,270 | A | | 3/1998 | Foody et al. ............... 709/316 |
| 5,890,176 | A | * | 3/1999 | Kish et al. ................... 715/511 |
| 5,974,428 | A | * | 10/1999 | Gerard et al. ............... 707/203 |
| 5,983,241 | A | * | 11/1999 | Hoshino ...................... 707/203 |
| 5,983,242 | A | * | 11/1999 | Brown et al. ............... 707/203 |
| 6,003,042 | A | | 12/1999 | Melahn ....................... 707/203 |
| 6,040,830 | A | | 3/2000 | Sahoo ......................... 345/747 |
| 6,112,024 | A | * | 8/2000 | Almond et al. ............. 717/122 |
| 6,119,130 | A | * | 9/2000 | Nguyen et al. ............. 707/203 |
| 6,134,552 | A | * | 10/2000 | Fritz et al. .................... 707/10 |
| 6,175,855 | B1 | * | 1/2001 | Reich et al. ................ 709/202 |
| 6,272,521 | B1 | * | 8/2001 | Jablonski et al. ........... 709/200 |
| 6,324,543 | B1 | * | 11/2001 | Cohen et al. ............... 707/200 |
| 6,347,323 | B1 | * | 2/2002 | Garber et al. ............... 707/203 |
| 6,351,753 | B1 | * | 2/2002 | Jagadish et al. ............ 707/203 |
| 6,378,003 | B1 | * | 4/2002 | Danforth .................... 709/316 |
| 6,460,052 | B1 | * | 10/2002 | Thomas et al. ............. 707/203 |
| 6,610,104 | B1 | * | 8/2003 | Lin et al. .................... 715/511 |
| 6,625,663 | B1 | * | 9/2003 | Baisley ....................... 719/310 |
| 6,826,750 | B1 | * | 11/2004 | Curtis et al. ................ 717/170 |
| 2001/0042073 | A1 | * | 11/2001 | Saether et al. | |

OTHER PUBLICATIONS

ObjectARX Proxy Objects, © 1997, pp 1-7.

* cited by examiner

*Primary Examiner*—Greta Robinson
*Assistant Examiner*—Miranda Le
(74) *Attorney, Agent, or Firm*—Gates & Cooper LLP

(57) ABSTRACT

To overcome the limitations in the prior art described above, and to overcome other limitations that will become apparent upon reading and understanding the present specification, the present invention discloses a method, apparatus, and article of manufacture for a computer implemented object-oriented computer system with intelligent object versioning. In accordance with the present invention, an object may be evolved across versions of product releases while maintaining the ability to save a file to one of the previous versions. Thus, objects are interoperable across multiple versions. Further object may be saved to a file version prior to when the object was introduced. When an object is requested to stream out data, the object determines which version to stream out itself and all of its parent/superior classes. If the file version is equal to or higher than the object's introduction version, the object and its superiors are streamed out in the file version. However, if the file version is lower than the object's introduction version, the object is represented by a proxy when the object is opened in the file and the data for the object is streamed out in the birth/introduction version of the object.

9 Claims, 5 Drawing Sheets

INTELLIGENT OBJECT VERSIONING

CROSS-REFERENCE TO RELATED APPLICATIONS

This application is related to the following co-pending and commonly-assigned patent application, which application is incorporated by reference herein:

U.S. patent application Ser. No. 08/880,184, entitled "INTELLIGENT PROXY OBJECTS", by Keshaba Chandra Sahoo, et al., filed on Jun. 20, 1997, now U.S. Pat. No. 6,040,830 issued on Mar. 21, 2000.

BACKGROUND OF THE INVENTION

1. Field of the Invention

The present invention relates generally to object-oriented computer systems, and in particular, to providing intelligent objects for varying document versions in an object-oriented computer system.

2. Description of the Related Art

In some object-oriented computer systems, an application program or product (e.g., a word processing program or a spreadsheet program) is used to create a file (e.g., a document or spreadsheet). A file from one application can also include one or more objects from another application (e.g., a word processing file may contain a spreadsheet object created using a spreadsheet program). Further, in computer graphics and computer aided design (CAD) programs, drawing elements such as lines, shapes, circles, arcs, etc. may be represented by objects. To associate an object with a specific file, data for the object is streamed out with the file when it is stored.

As application programs are enhanced and updated, newer versions of the application program may be released. Accordingly, the files created by the applications may be tied to or related to a particular application version. Objects and their attributes may evolve over application program versions. Additionally, since the objects are stored with particular versions of a file, the objects are tied to the version of the file. By tying an object to particular version of a file, the evolution of the object is hindered across multiple versions of an application program/product.

For example, if a user wants to save a file in a prior application version (e.g., for use by other users that do not have the most recent version of the application), and the object was created/introduced subsequent to the prior file version, the user has to choose between not evolving the object or not saving the object to the previous file versions.

In another example, an object such as a circle may first be introduced in one version (version A) of an application program and an attribute such as the ability to fill the circle may be introduced in a later version (version B). By tying the object to the file version, the user is forced to choose between not evolving the object (and utilizing the fill attribute) or not saving the object to the previous file version (version A). The fast pace at which products are revised today makes either of these choices unacceptable.

There is a need in the art to enable a user or developer to evolve an object across versions of product releases and still be able to save files to one of the previous product versions.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented object-oriented computer system with intelligent object versioning.

In accordance with the present invention, an object may be evolved across versions of product releases while maintaining the ability to save files to one of the previous product versions. Thus, objects are interoperable across multiple versions. Further, objects may be saved to a file version prior to when the object was introduced.

When an object is requested to stream out data, the object determines which version to stream out itself and all of its parent/superior classes. If the file version is equal to or higher than the object's introduction version, the object and its superiors are streamed out in the file version. However, if the file version is lower than the object's introduction version, the object is represented by a proxy when the object is opened in the file and the data for the object is streamed out in the birth/introduction version of the object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to evolve an object across versions of a product releases and still be able to save a file to one of the previous product versions thereby making objects interoperable across multiple versions. Such embodiments enable saving a file (and object data) to a product version prior to when the object was introduced.

Hardware Environment

Figure 1:
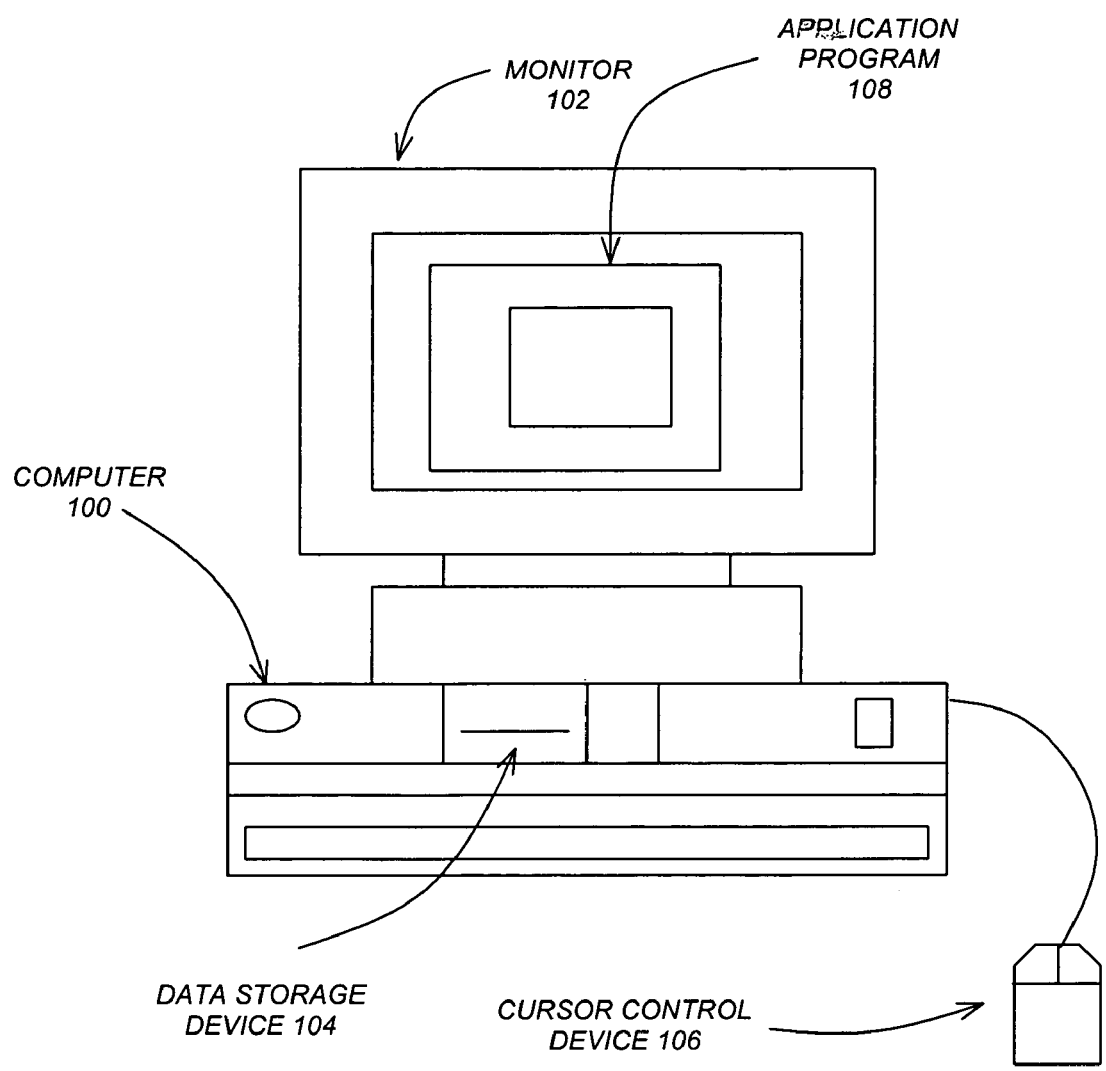
FIG. 1 is a block diagram illustrating an exemplary hardware environment used to implement one or more embodiments of the invention.

FIG. 1 is an exemplary hardware and software environment used to implement one or more embodiments of the invention. One or more embodiments of the invention are typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented application program 108. Generally, the application program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Objects and Classes

As described above, objects may be utilized in application programs 108. Objects may be described and defined in a variety of object-oriented programming languages. In most such languages, objects are defined by one or more classes. A class sets forth methods/behavior and attributes for an object (or part of an object). Subclasses may define further methods and attributes for the object. When an object is utilized by an application program, the methods and behaviors from all of the classes which define the object are utilized to create an instance of the object (which is referred to as instantiation). Thereafter, the data that represents the object instance (including the actual methods and attributes) may be streamed out to a file.

Figure 2:
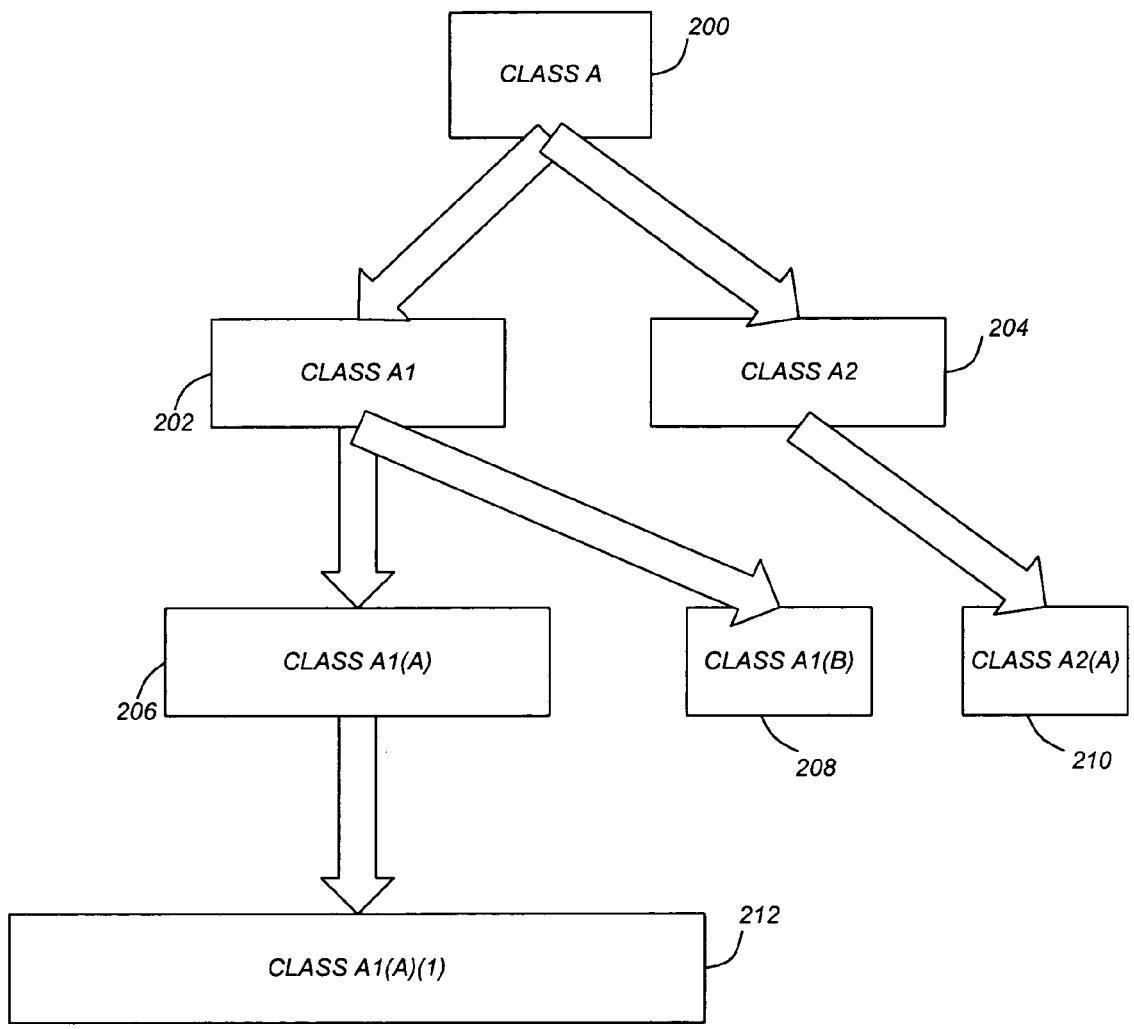
FIG. 2 illustrates a hierarchical system of classes in accordance with one or more embodiments of the invention.

In a hierarchical system of classes, an object's data is the sum of its class-specific data and that of all its superior classes. FIG. 2 illustrates a hierarchical system of classes. Class A 200 is the root class or parent class of all other classes 202–212. The children of Class A 200 are Class A1 202 and Class A2 204 and are often referred to as subclasses of Class A 200. The remaining classes 206–212 are further descendants and may also be subclasses of Class A 200 or their immediate parent. All classes contain the data from their parent/superior class plus additional data. Thus, class A1 202 contains data from Class A 200 plus additional data. Similarly, Class A1(A) 206 contains the data from Class A1 202 and Class A 200 plus additional data. In order to completely represent an instance of an object, when the object instance is streamed out to a file, the data of its parent/superior classes may also be streamed out to the file.

This hierarchy of classes applies in all types of application programs 108. For example, in a spreadsheet application, if Class A 200 is a spreadsheet object, Class A1 202 is the spreadsheet object of (or contains the data from) Class A 200 plus additional features. Thus, the data of a particular object (or an instance of the object) includes data for the methods and attributes of its parent/superior objects.

Object Versions and Embodiment Details

Objects may be changed over time such that different versions contain different methods or attributes. For example, in a computer graphics application, a circle object may be introduced in version A, the ability to fill the circle may be provided in version B, and the ability to view the circle in 3 D may be provided in version C. Further, an attribute for an object may indicate the version of the object (e.g., 1, 1.1, 2, etc.). When an object is streamed out to a file, the most derived class of the object has the authority to determine which version it wants to be streamed out as. Accordingly, the most derived class of the object instructs all of its parent/superior classes of the selected version when inquired. The superior classes query for such information when they are requested to stream out data on behalf of the object in question.

Figure 3:
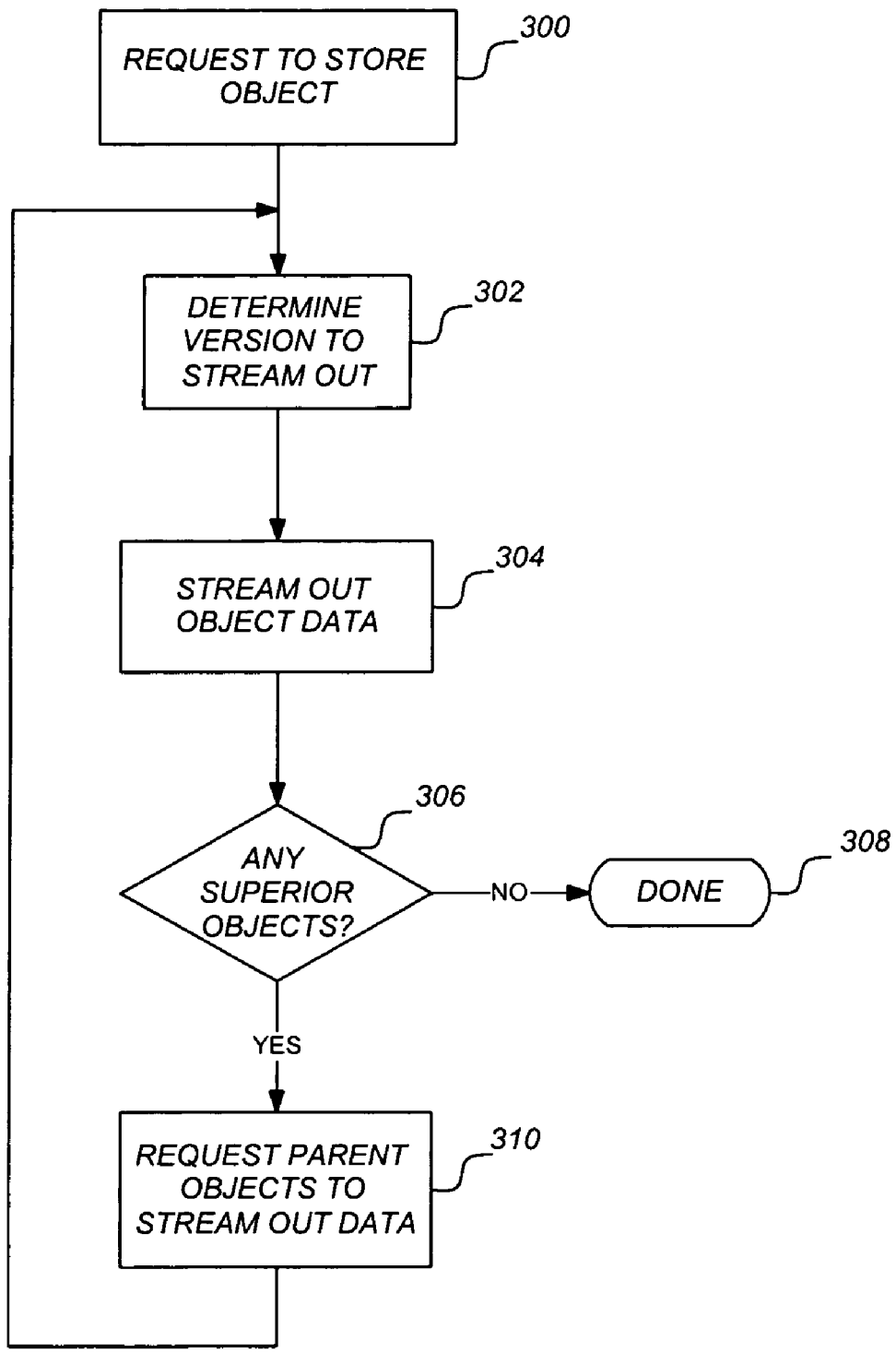
FIG. 3 is a flow chart for streaming out data in accordance with one or more embodiments of the invention.

FIG. 3 is a flow chart for streaming out data in accordance with one or more embodiments of the invention. At step 300, a request to store an object is issued. Such a request may be issued when a file or document, which serves as persistent storage for the object, is saved (e.g., to data storage device 104). Alternatively, application program 108 may request that the object be stored for other reasons (e.g., for caching the object, for storing changes to the object, etc.). At step 302, the object determines which version to stream out in (if the object is a parent/superior object, the parent/superior object queries the child object for the version). At step 304, the data of the object is streamed out in the version selected.

At step 306, an object determines if there are any more parent/superior objects that need to be streamed out. If not, all data has been streamed out and the process is complete at step 308. If parent objects need to be streamed out, the object requests the parent object(s) to stream out their data at step 310. The process continues with each parent object at step 302. However, as indicated above, since a parent/superior object is being streamed out, at step 302 the parent object/superior class queries the requesting/child object for version information (i.e., the version to stream out in).

Figure 4A:
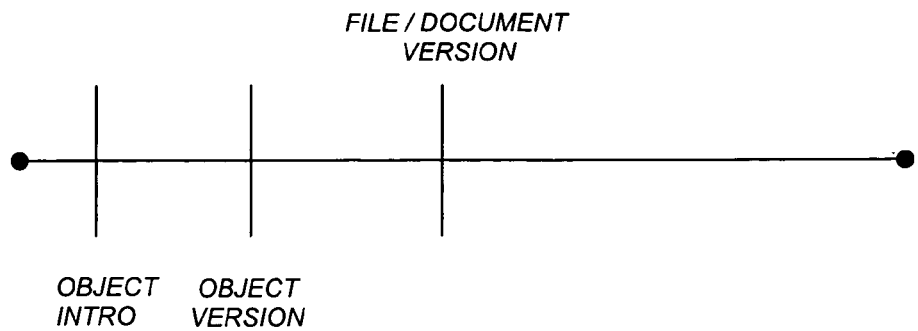
FIGS. 4A, 4B, and 4C illustrate various relevant time lines for object and document versions in accordance with one or more embodiments of the invention.
Figure 4B:
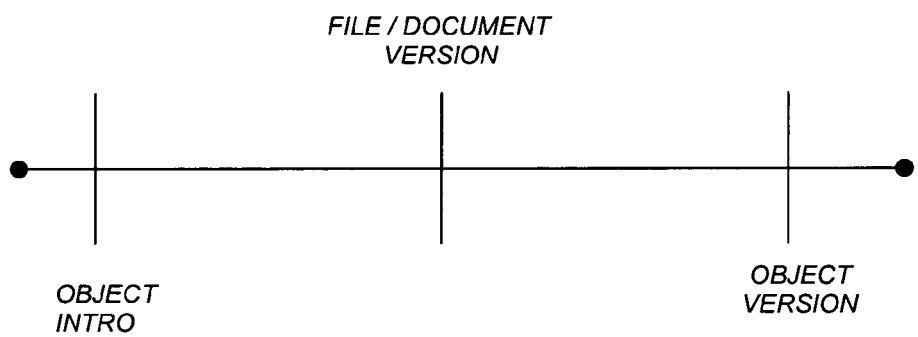
Figure 4C:
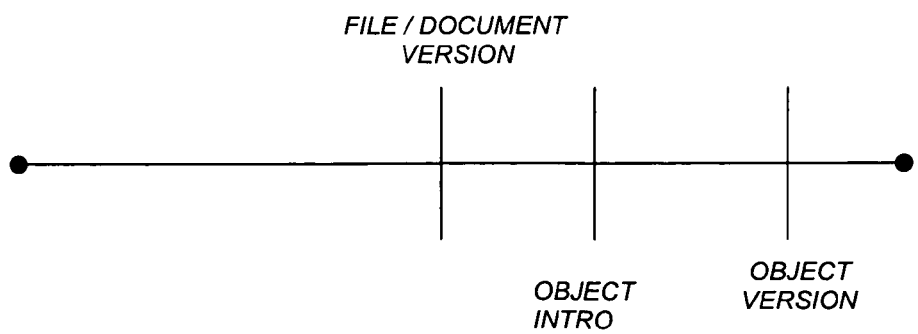
Figure 5:
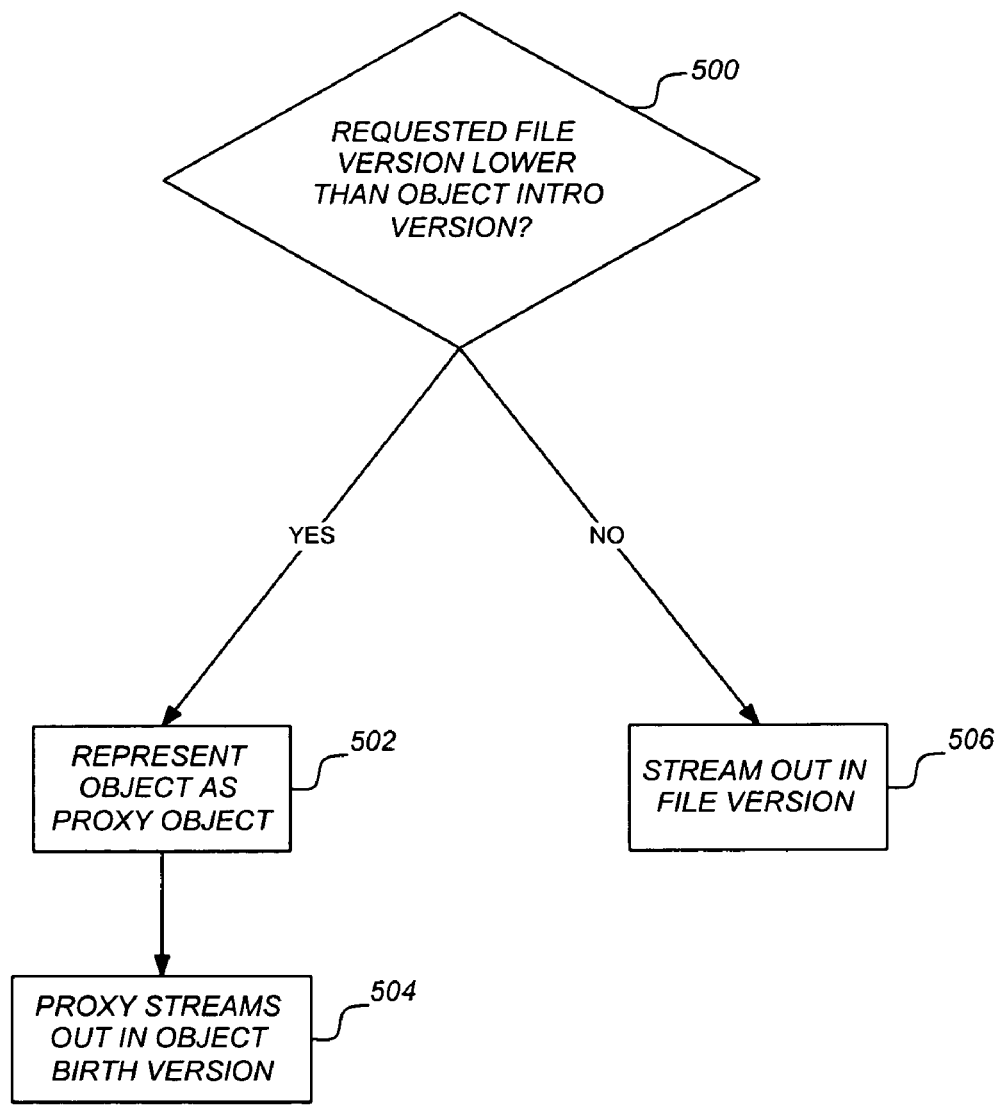
FIG. 5 is a flow chart illustrating the details of determining a streaming version in accordance with one or more embodiments of the invention.

The child/requesting object determines which version to stream out the data in (for itself and all parent/superior objects) at step 302. To help understand determination step 302, FIGS. 4A, 4B, and 4C illustrate the various relevant time lines. In FIG. 4A, both the object version and the version when the object was introduced are lower/earlier (or equal to) the document/file version. In FIG. 4B, the current object version is higher/later than the current document/file version and the version of the object's introduction is lower/earlier than the current document/file version. In FIG. 4C, the current version of the object and the version of the object's introduction is higher/later than the file/document version.

In view of FIGS. 4A–4C, FIG. 5 is a flow chart illustrating the details of the determination step 302. At step 500, the object determines if the requested file version is lower than the version in which the object was introduced. In other words, is the version of the file that contains the object lower than the version in which the object was introduced? Phrased another way, was the object introduced in a file version earlier or later than the current version?

If the requested file version is equal to or higher than the version in which the object was introduced (i.e., FIG. 4A and FIG. 4B), the class of the object and its superiors stream out in the requested file version itself at step 506. In other words, if the object was introduced in a version earlier than or equal to the current version of the file, the object and its superiors are streamed out in the current version of the file. Thus the object is saved with the file in the same format.

However, if the requested file version is lower than the version in which the object was introduced (i.e., FIG. 4C), the class of the object and its superiors stream out in the "birth" version of the object in steps 502 and 504 (see details below). In other words, if the object was introduced after the version of the current file (e.g., the file in which the object is being saved), the object is streamed out in the "birth" version (the version of the object when it was first introduced). Thus, earlier file versions contain the earliest possible version of an object if necessary.

Since the version of the object's introduction is higher than the file version in FIG. 4C, problems may be encountered by streaming out the object in its introduction version. For example, the prior application program version may not have the capabilities to read, display, or utilize the object (when the prior application program version is lower than the object introduction version). Consequently, the object is represented as a proxy object when the file is opened in the old version at step 502. The proxy object holds onto the object's data and faithfully streams the data in an out of persistent storage at step 504. The proxy object may provide a limited set of functionality for the object. For example, in a computer graphics application, the proxy object may merely display a bitmap of a circle object Proxy objects are mote fully described in U.S. patent application Ser. No. 08/880,184, entitled "INTELLIGENT PROXY OBJECTS", by Keshaba Chandra Sahoo, et al., filed on Jun. 20, 1997, now U.S. Pat. No. 6,040,830 issued on Mar. 21, 2000 which is hereby fully incorporated by reference.

By storing the object in its introduction or "birth" version, if the file is opened in an application program in between the stored version and the version where the document was created, the object may have functionality beyond merely displaying a bitmap. For example, suppose a circle object is introduced in version 3 of a graphics application program, with the ability to fill the circle object added in version 5 of the graphics application program. Further, suppose, a user of Application program 5 is saving a drawing containing the circle object in the format of version 1 (e.g., using a "Save As" function) of the graphics application program. In accordance with embodiments of the invention, the circle object is stored in version 3 (the "birth" version of the object) and a proxy object is utilized when the drawing is opened in version 1. However, if another user opens the same file using version 3 of the graphics application program, some of the functionality of the object is still available because of the version in which it is stored (e.g., the ability to utilize a circle object).

Thus, if the file is saved to a version equal to or higher than the object's birth/introduction version (FIG. 4A and FIG. 4B), the object is alive and operates correctly when the file is opened in that version of the product (step 506). However, if the object is saved to a file version prior to the object's birth/introduction version (FIG. 4C), the object is represented by a proxy object when the file is opened in the old version of the product (steps 502–504).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the user with the ability to utilize any version of an object regardless of the document/file version.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method for storing object data of a requested file in an object-oriented computer system, comprising:
   obtaining a request to save a file in a requested file version, wherein the file contains an object;
   determining if the requested file version is earlier than an object introduction version of the object;
   saving the file by streaming out data representing an instance of the object, to the file, in the requested file version if the requested file version is equal to or later than the object introduction version, wherein the data comprises actual methods and attributes of the object; and
   saving the file by streaming out the data representing the instance of the object, to the file, in the object introduction version if the requested file version is earlier than the object introduction version; wherein the requested file version is different from a current version of a computer application that is performing the saving.

2. The method of claim 1 wherein the requested file version is earlier than the object introduction version, the method further comprising representing the object as a proxy object when a file is opened, and wherein the streaming out in the object introduction version comprises:
   the proxy object holding onto the object's data; and
   the proxy object streaming out the object's data.

3. The method of claim 1 further comprising:
   one or mote superior objects of the object querying the object to determine a version to stream our to the file;
   the object responding to stream out in the requested file version if the requested file version is equal to or later than the object introduction version;
   the object responding to stream out in the object introduction version if the requested file version is earlier than the object introduction version; and
   the one or more superior objects of the object streaming out data in accordance with the object response.

4. An apparatus for storing object data of a requested file in an object-oriented computer system comprising:
   an object-oriented computer system having a memory and a data storage device coupled thereto;
   one or more computer programs, performed by the computer, for obtaining a request to save a file in a requested file version, wherein the file contains an object, for determining if the requested file version is earlier than an object introduction version of the object, to the file, in the requested file version if the requested file version is equal to or later than the object introduction version, wherein the data comprises actual methods and attributes of the object; and
   saving the file by streaming out the data representing the instance of the object, to the file, in the object introduction version if the requested file version is earlier than the object introduction version; wherein the requested file version is different from a current version of a computer application that is performing the saving.

5. The apparatus of claim 4 wherein the requested file version is earlier than the object introduction version, further comprising one or more computer programs, performed by the computer, for representing the object as a proxy object when a file is opened, and wherein the streaming out in the object introduction version comprises:
   the proxy object holding onto the object's data; and
   the proxy object streaming out the object's data.

6. The apparatus of claim 4 further comprising:
   means for one or more superior objects of the object to query the object to determine a version to stream out to the file;
   means for the object responding to the one or more superior objects to stream out in the requested file version if the requested file version is equal to or later than the object introduction version;

means for the object responding to the one or more superior objects to stream out in the object introduction version if the requested file version is earlier than the object introduction version; and means for the one or more superior objects of the object string out data in accordance with the object response.

7. An article of manufacture comprising a program storage medium readable by a computer and embodying one or more instructions executable by the computer to perform a method for storing object data of a requested file in an object-oriented computer system, the method comprising:

obtaining a request to save a file in a requested file version, wherein the file contains an object;

determining if the requested file version is earlier than an object introduction version of the object;

saving the file by streaming out data representing an instance of the object, to the file, in the requested file version if the requested file version is equal to or later than the object introduction version, wherein the data comprises actual methods and attributes of the object; and saving the file by streaming out the data representing the instance of the object, to the file, in the object introduction version if the requested file version is earlier than the object introduction version; wherein the requested file version is different from a current version of a computer application that is performing the saving.

8. The article of manufacture of claim 7 wherein the requested file version is earlier than the object introduction version, the method further comprising representing the object as a proxy object when a file is opened, and wherein the streaming out in the object introduction version comprises:

the proxy object holding onto the object's data; and the proxy object streaming out the object's data.

9. The article of manufacture of claim 7 wherein the method further comprises:

one or more superior objects of the object querying the object to determine a version to stream out;

the object responding to stream out in the requested file version if the requested file version is equal to or liter than the object introduction version;

the object responding to stream out in the object introduction version if the requested file version is earlier than the object introduction version; and the one or more superior objects of the object streaming out data in accordance with the object response.

* * * * *